United States Patent [19]

Farhadiroushan

[11] Patent Number: 5,515,459
[45] Date of Patent: May 7, 1996

[54] OPTICAL FIBRE PRESSURE SENSOR

[75] Inventor: Mahmoud Farhadiroushan, London, United Kingdom

[73] Assignee: Sensor Dynamics Inc., Winchester, United Kingdom

[21] Appl. No.: 290,855

[22] PCT Filed: Feb. 15, 1993

[86] PCT No.: PCT/GB93/00315

§ 371 Date: Aug. 15, 1994

§ 102(e) Date: Aug. 15, 1994

[87] PCT Pub. No.: WO93/17314

PCT Pub. Date: Sep. 2, 1993

[30]     Foreign Application Priority Data

Feb. 19, 1992 [GB] United Kingdom ............... 9203471

[51] Int. Cl.[6] ..................................... G02B 6/27
[52] U.S. Cl. .............................. 385/12; 385/11
[58] Field of Search ................... 385/12, 11, 13, 385/109, 100, 111; 250/227.15, 227.16

[56]         References Cited

FOREIGN PATENT DOCUMENTS 0144509   6/1985   United Kingdom ................ 385/12

OTHER PUBLICATIONS

Meltz et al. "Formation of Bragg Gratings in Optical Fiber by a Transverse Holographic Method" Optics Letters Aug. 1989 vol. 14, pp. 823–825.

Yoshino et al. "Fiber–Optic Fabry–Perot Interferometer and Its Sensor Applications", Oct. 1982 IEEE pp. 1624–1633.

Jansen et al. "High Pressure Fiber–Optic Sensor with Side--Hole Fiber" SPIE vol. 789 Fiber Optic Sensors II (1987) pp. 56–61. No month.

*Primary Examiner*—Phan T. H. Palmer
*Assistant Examiner*—John D. Lee
*Attorney, Agent, or Firm*—Iandiorio & Teska

[57]           ABSTRACT

An optical fibre pressure sensor in which two or more lengths of side-hole fibre (1, 2) are joined together at their ends, in which at a joint (3) the two pieces are rotated relative to one another around their common longitudinal axis, in which one or more lengths of side-hole fibre have their holes (5) sealed, and in which one or more lengths of side-hole fibre have their holes (4) exposed to the same pressure as is external to that length of fibre.

12 Claims, 5 Drawing Sheets

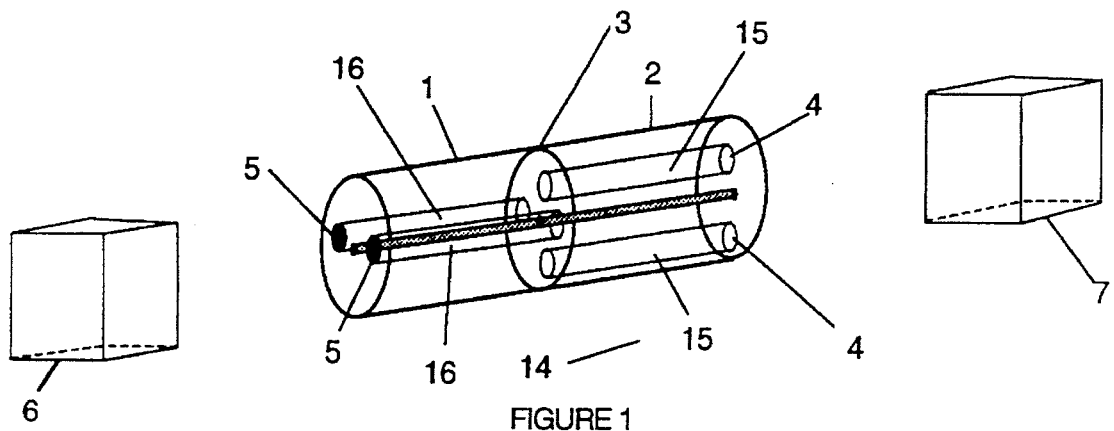
FIGURE 1
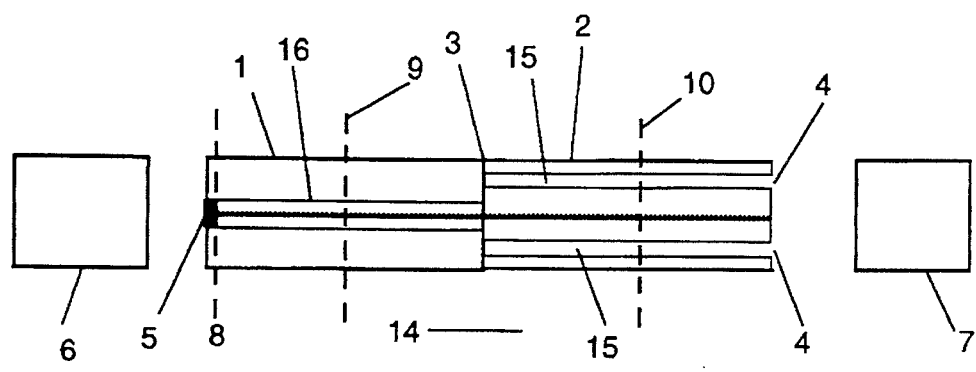
FIGURE 2
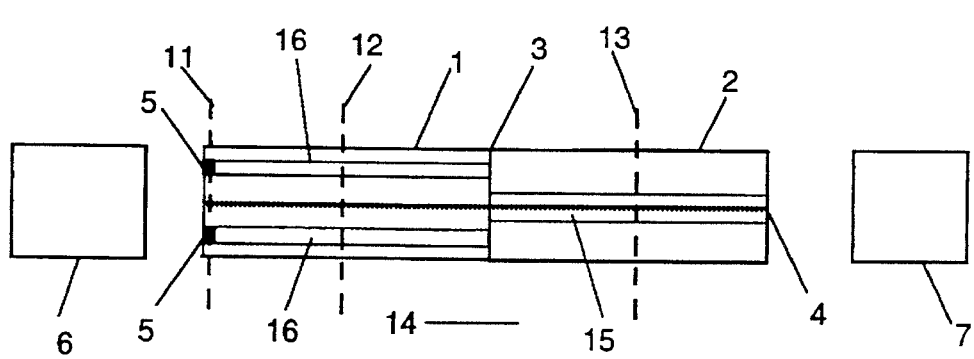
FIGURE 3
 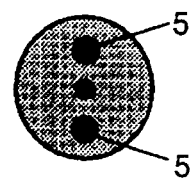 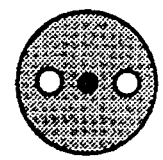 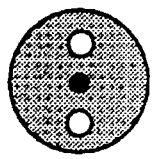
FIGURE 4a    FIGURE 4b    FIGURE 4c    FIGURE 4d

OPTICAL FIBRE PRESSURE SENSOR

FIELD OF THE INVENTION

A variety of industrial processes require knowledge of fluid pressure in order effectively to control productivity and quality of the process. In particular, the pressures and temperatures encountered are often very different to those of ambient conditions. Examples are the chemical process industries, internal combustion engine control and oil production. A pressure sensor manufactured of a robust material such as silica can withstand extreme pressures and temperatures and thus is particularly useful.

BACKGROUND OF THE INVENTION

European Patent Application EP 0 144 509 A3 "Fiber Optic interferometer transducer" teaches how a dual path polarimetric interferometer may be constructed so that, when suitable means convert isotropic pressure to anisotropic radial forces on an optical fibre, a useful signal results, which may be used as a measure of the isotropic pressure. Suitable means are described in the paper by K. Jansen and Ph. Dabkiewicz. "High pressure fiber-optic sensor with side-hole fiber", SPIE Proceedings, Fiber Optic Sensors II, Vol. 798 pp. 56–60 1987. where a single mode optical fibre is manufactured with side holes so as to form a polarimetric sensor sensitive to isotropic pressure. The dual path polarimetric interferometer operates by obtaining a measurement of the optical path length difference between the two orthogonal polarisation modes which are guided by the fibre. The optical path length difference is made intentionally sensitive to pressure, but is also generally sensitive to temperature which is often undesirable. Thus, such polarimetric pressure sensors normally require temperature compensation to be useful.

The output of the dual-path polarimetric interferometer sensors may be expressed in the form $COS(\phi)$, where the optical path length difference is expressed as a phase delay $\phi$ such that:

$$\phi=(2\pi L/\lambda).(A[T]+B[T].P)$$

and where T is the temperature. P the pressure. $\lambda$, the optical wavelength. L the length of fibre. A[T] the inherent birefringence function of temperature, and B1[T] the pressure dependent birefringence function of temperature. When two lengths of fibre, designated 1 and 2. and of lengths L1 and L2. are joined together, and subject to pressures P1 and P2 respectively, then the combined phase delay is given by:

$$\phi 12=(2\pi/\lambda).((L1.A1[T]+L2.A2[T])+(L1.B1[T].P1+L2.B2[T].P2))$$

when the two orthogonal birefringent axes of the two fibres are aligned. and:

$$\phi 12=(2\pi/\lambda).((L1.A1[T]-L2.A2[T])+(L1.B1[T].P1-L2.B2[T].P2))$$

when the two orthogonal birefringent axes of the two fibres are at right angles.

In general, the temperature sensitivity of the inherent birefringence, A, is at least an order of magnitude greater than that of the pressure dependent birefringence, B, and so there is considerable advantage in miniraising the inherent component. If the two lengths are made identical, L1=L2=L. and the fibres rotated 90° relative to each other about their longitudinal axis at the join, as taught by J.P. Dakin and C. Wade. "Compensated polarimetric sensor using polarisation-maintaining fibre in a differential configuration", Electron. Lett., Vol. 20, No.1, pp. 51–53, 1984. then A1[T]=A2 [T], and so the inherent birefringence component cancels to give:

$$\phi 12=(2\pi L/\lambda).(B1[T].P1-B2[T].P2)$$

If B1[T]=B2[T], which will be the case if the two pieces of fibre are identically sensitive to pressure, then a useful signal will only be obtained if the two pieces of fibre experience different pressures, that is P1 is not equal to P2. This is the approach taught by the prior art, Dakin and Wade. However, there is an alternative approach in which a useful signal may be obtained when the two pieces of fibre experience the same pressure, that is P1 equals P2. If B1[T] may be made not equal to B2[T] and yet the expression A1[T]=A2[T] still applies, then P1 may equal P2, that is the two pieces of fibre may experience the same pressure, and yet temperature compensation of the inherent birefringence still occur. This is the basis for the present invention, where B1[T] and B2[T] are made to differ by changing the pressure experienced within side-holes formed in the fibre.

In some cases it may be advantageous to use unequal lengths of fibre in order to bias, the sensor at a convenient phase delay, especially when temperature compensation is only required over a limited range of operation. In a particular case, for example, the inherent birefringence component A1[T] and the pressure induced birefringence component B1[T].P1 of one section may be compensated by the inherent birefringence A2[T] of the other section without compromising the overall pressure sensitivity. The present invention allows the adjustment of the lengths of fibre for this type of compensation. Also, it may be preferred to use unequal lengths of fibre so that the sensor has a particular temperature induced birefringence. For example, the overall temperature induced birefringence may be adjusted to be positive or negative with respect to the pressure induced birefringence by choosing the compensating fibre to be shorter or longer than the sensing section. In this case, the output of a number of sensors may be combined to differentiate the temperature and pressure induced birefringence changes. For example, it would be advantageous to combine two sensors, where one has positive and the other has negative temperature induced birefringence, but both have a similar value of pressure induced birefringence.

In order to achieve the separation of the two pressure regions as required by the prior art, some form of high pressure seal is required which normally acts upon the sensitive regions of the sensor. This leads to undesirable imperfections in the operation of the sensor which can be avoided with the present invention.

A different type of optical fibre sensor may be constructed by inserting partially reflecting mirrors into the fibre waveguide, such as by depositing a dielectric coating onto the end of the fibre and then splicing to another length of fibre, to form a Fabry-Perot interferometer as taught by T. Yoshini. K. Kurosawa. K. Itoh and T. Ose. "Fiber-Optic Fabry-Perot interferometer and its sensor applications", IEEE J. Quantum Electron., Vol. QE-18, pp. 1624–1632, 1982. Alternatively, partially reflected mirrors may be formed by writing a grating into the fibre as taught by G. Meltz. W. Morey, and W. H. Glenn. "Formation of Bragg Gratings in optical fibres by transverse holographic method". Opt. Lett., 14, pp. 823–825, 1989. Both these forms of sensor also require temperature compensation.

SUMMARY OF THE INVENTION

An aim of the present invention is to provide a means of temperature compensating a dual path polarimetric optical fibre pressure sensor without the restriction of prior art that the two sensitive regions of the sensor must lie in two separate regions of pressure.

A further aim of the present invention is to provide a means of compensating a dual path polarimetric optical fibre pressure sensor by the selection of the relative lengths of the two pressure sensitive fibre sections of the sensor.

BRIEF DESCRIPTION OF THE INVENTION

According to the present invention, there is provided an optical fibre pressure sensor in which two or more lengths of side-hole fibre are joined together at their ends, in which at a joint the two pieces are rotated relative to one another around their common longitudinal axis, in which one or more lengths of side-hole fibre have their holes sealed, and in which one or more lengths of side-hole fibre have their holes exposed to the same pressure as is external to that length of fibre.

In preferred embodiments of the present invention, the angle of rotation at the join between fibre lengths is close to 90°, preferably exactly 90°. and the total lengths of fibre which have sealed side-holes and open side-holes are almost equal, preferably exactly equal.

An advantage of the present invention is that both lengths of fibre may be exposed externally to one region of pressure and temperature, while the side-holes of one of the fibre lengths ate also subject to this same external pressure. The pressure to which tho side-holes of one length of fibre is subject may differ from that of the other since the side-holes at both ends of one fibre may be sealed, hence forming a sealed enclosure, whereas the side-holes of the other fibre may be open. The birefringence of the fibre depends upon the difference in pressure between that experienced by the outer surface of the fibre and the pressure within the side-holes. Thus the sensor will give a useful output when both lengths of fibre are exposed to the same external pressure. When the two lengths of fibre are subject to the same temperature, the overall temperature sensitivity is reduced, because the optical path lengths of the two orthogonal polarisation states are similar. The closer the angle of rotation is to 90°, and the closer the open and closed lengths of fibre are to being equal, the more effective the temperature compensation is in magnitude and temperature range.

BRIEF DESCRIPTION OF THE DRAWINGS

Embodiments of the invention will now be described solely by way of example and with reference to the accompanying drawings in which:

FIG. 1 shows a polafimetric pressure sensor using two sections of side-hole fibre according to the present invention;

FIG. 2 shows a longitudinal section of the polafimetric pressure sensor shown in FIG. 1;

FIG. 3 shows a longitudinal section of the polarimetric pressure sensor shown in FIG. 1, but at 90° to that of FIG. 2;

FIGS. 4a, 4b, 4c and 4d show cross-sectional views of the polarimetric sensor depicted in FIGS. 2 and 3;

DETAILED DESCRIPTION OF THE INVENTION

Figure 5:
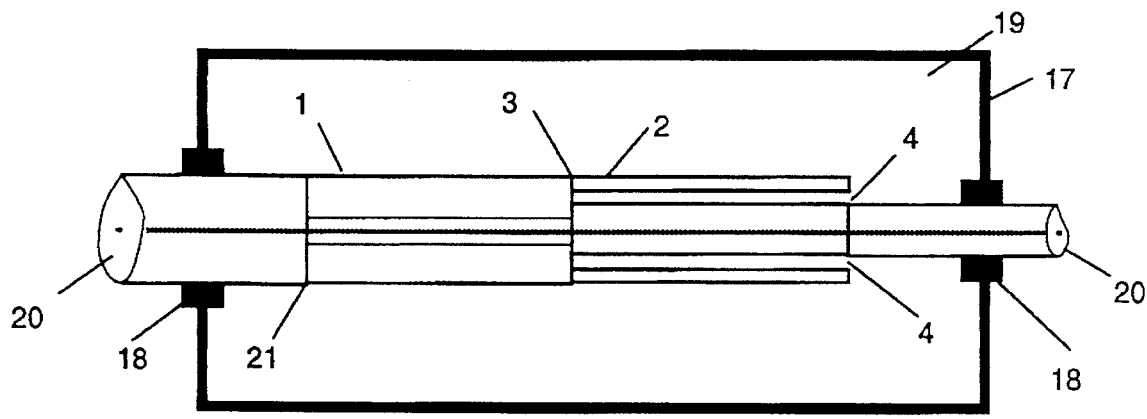
FIG. 5 shows embodiment of the present invention utilising optical fibres in a transmission configuration.

With reference to FIG. 1, which is a three dimensional view, and FIGS. 2 and 3, which are longitudinal sections along diameters at right angles to each other, a sensor according to the present invention comprises a length of side-hole fibre I joined at a joint 3, preferably fusion spliced, to another length of side-hole fibre 2 with diameters that pass through the side holes of the two lengths aligned at an angle, preferably exactly 90 degrees. The side-holes of the one length 2 of fibre are left open 4, and the side-holes of the other length of fibre 1 are sealed 5, by any suitable means such as plugs or adhesive. Light from a source is delivered to the sensor by means of light delivery optical means 6, and the light emerging from the sensor is collected by light collection optical means 7. It should be understood that the source and collection optical means may be interchanged with respect to the side-hole fibres 1, and 2, so means 6, collects light and means 7, delivers light, without affecting the present invention. The optical means consists of a lens, an optical fibre, or any other suitable optical delivery or collection means. Light is to be taken to mean any range within the electromagnetic spectrum suitable for operation of the sensor.

Four cross-sections, at right angles to the longitudinal axis, and at different positions along the two lengths of fibre, are given in FIG. 4. FIG. 4a shows the cross-section 8 of the end where the side-holes are sealed 5 in FIG. 2, and FIG. 4b is the same section in FIG. 3. FIG. 4c shows the cross-section 9 in FIG. 2, and section 13 in FIG. 3, along the length of the fibre. FIG. 4d shows the equivalent cross-section at 10 in FIG. 2, and 12 in FIG. 3.

Both lengths of fibre 1 and 2 are exposed to the same surrounding temperature and pressure 14 which is the same pressure experienced in the side-holes 15 of the open fibre 2. The pressure 16 inside the side-hole of the other length of fibre 1 is determined by the pressure and temperature of the fluid that was trapped in the side-holes at the time the seals 5 and joint 3 were formed. Preferably, but not necessarily, a vacuum exists inside the side-holes of fibre 1.

In FIGS. 5, 6, 7, 8, 9, 10 and 11, a number of different embodiments of the present invention are shown enclosed by a chamber 17 and with pressure seals 18, such that the pressure 19 within the chamber may be measured by the present invention, but with the measurement apparatus (not shown) external to the chamber 17 and at a different pressure. The depiction of the chamber in these diagrams is for clarification of the use of the present invention and does not indicate that such a chamber is a necessary part of any of the embodiments of the present invention.

FIG. 5 shows a preferred embodiment according to the present invention in which light delivery and light collection means are connected to the side-hole fibres 1 and 2 by means of optical fibres 20, such that the side-holes of one length of fibre 2 are left open 4 and the side-holes of the other length of fibre 1 are sealed at the joint 2.1, preferably by fusion splicing, and where the two side-hole fibres are joined at joint 3, preferably also by fusion splicing.

Figure 6:
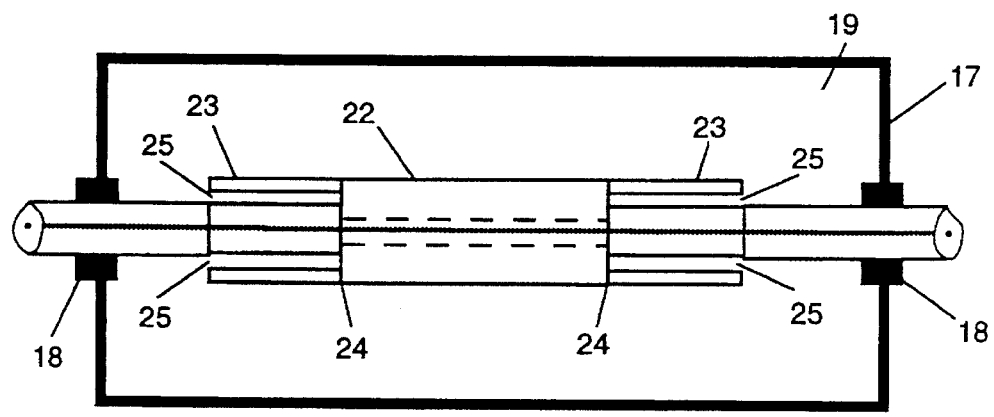
FIG. 6 shows a longitudinal section of another embodiment of the present invention in which the side holes on both ends of the sensor are exposed to the surrounding pressure whereas the side holes of the middle section are sealed.

FIG. 6 shows a longitudinal section of an alternative embodiment according to the present invention, in which a length of side-hole fibre 22 is connected between two other lengths of side-hole fibres 23, such that the side-holes of the fibres are sealed at the joints 24, preferably by fusion splicing, and the side-holes of the other ends 25 remain open to the external pressure 19. The total length of the fibre 22, with the side-holes at both ends sealed, is preferably equal to the sum of the lengths of fibre 23 with the side-holes open at one end.

Figure 7:
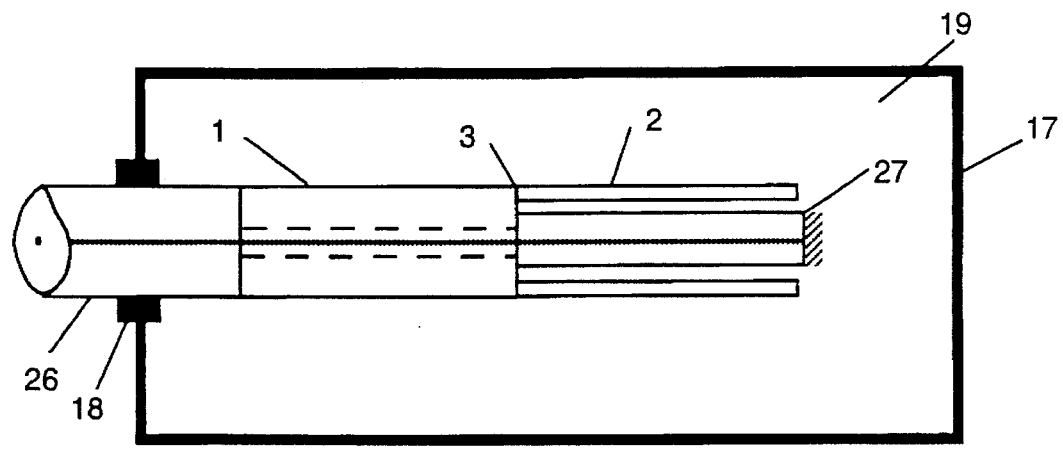
FIG. 7 shows a longitudinal section of a preferred embodiment according to the present invention in a reflection configuration.

FIG. 7 shows a preferred embodiment according to the present invention in which optical fibre 26 acts both as delivery and collection means, since light delivered to one end of the fibre is reflected at a mirror 27 at the other end. The mirror 27 may be separate from the fibre, or more preferably, deposited upon the end of the fibre.

Figure 8:
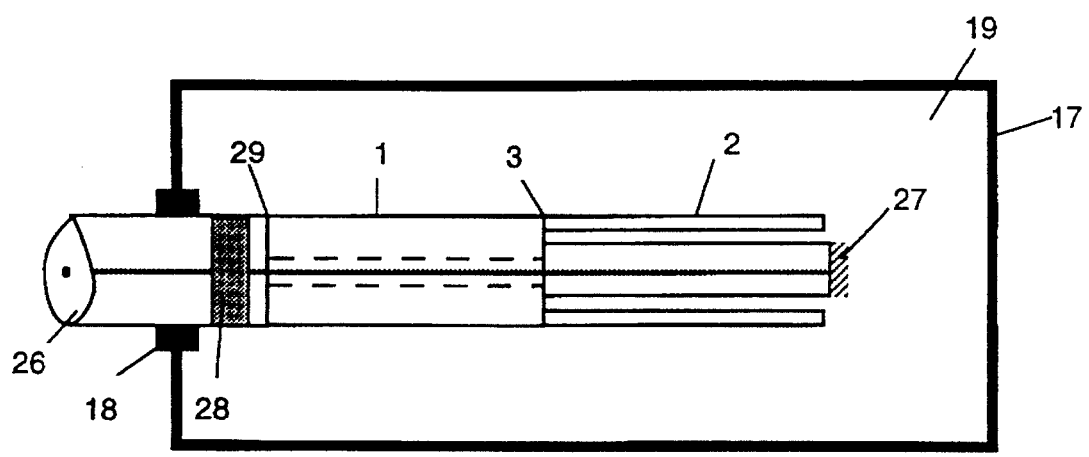
FIG. 8 shows a more preferred embodiment, in which a fibre polaxiser is utilised.

FIG. 8 is a more preferred embodiment in which an optical fibre polariser 28 is combined with the present invention to form a polarimetric interferometer. The polariser 28, which is included by the delivery and collection means 26, is joined, preferably fusion spliced, at joint 29 to the fibre 1 with its axis aligned at about 45 degrees, preferably 45 degrees, to the side-hole axes, which also provides a means of sealing the side-holes of fibre 1 at the joint 29.

Figure 9:
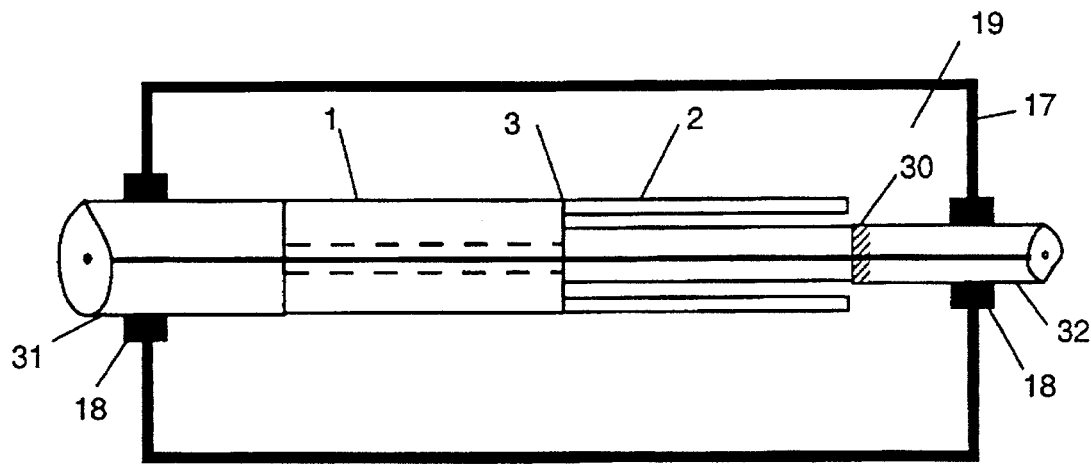
FIG. 9 shows a longitudinal section of polarimetric sensor including a partially reflective mirror.

FIG. 9 shows a further embodiment, according to the present invention, which includes a partially reflective mirror 30 from which a portion of light is reflected back through the side-hole fibres 1 and 2 to the delivery means 31, and another portion of light is transmitted to the collection means 32.

Figure 10:
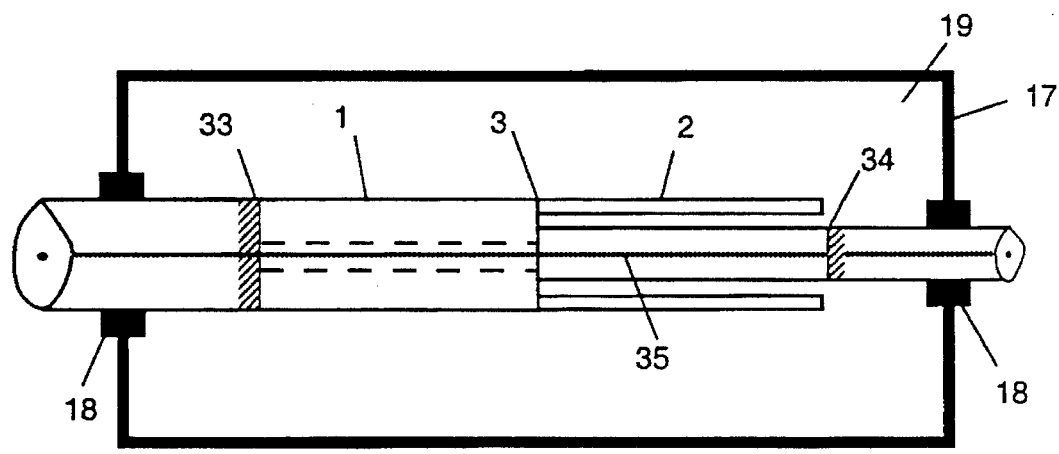
FIG. 10 shows a longitudinal section of a polarimetric Fabry-Perot type interferometer using side-hole fibre according to the present invention in a transmission configuration.

FIG. 10 illustrates a Fabry-Perot polarimetric sensor embodiment, according to the present invention, in which the ends of the side-hole fibres 1 and 2 include partially reflective mirrors 33 and 34 inserted into the optical waveguide 35.

Figure 11:
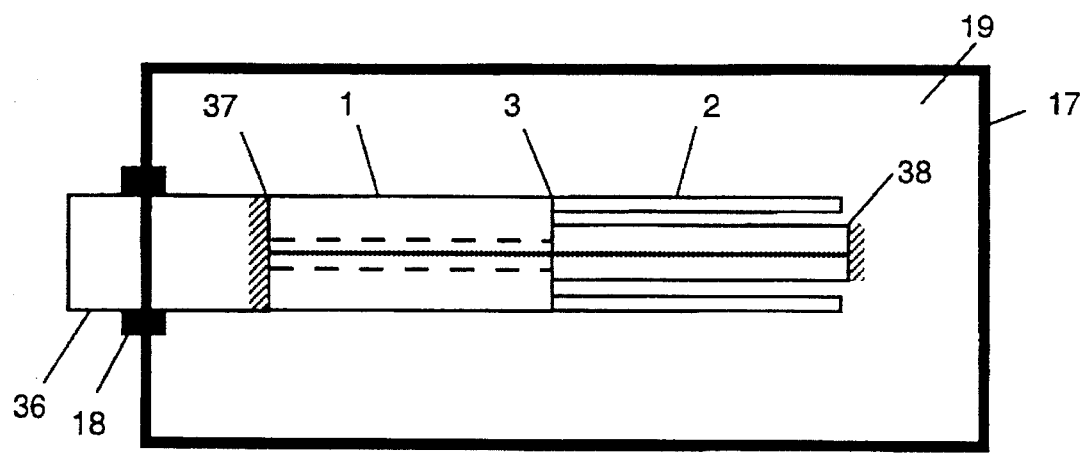
FIG. 11 shows a longitudinal section of a polarimetric Fabry-Perot type interferometer using side-hole fibre according to the present invention in a reflection configuration.

FIG. 11 shows a further embodiment of the Fabry-Perot polarimetric interferometer in which optical fibre 36 acts both as light delivery and collection means since light is partially reflected from a mirror 37 and a mirror 38, which is at the end of the side-hole fibre, and preferably deposited upon it.

In FIGS. 5, 6, 7, 8, 9, 10, and 11, it should be understood that the side-hole fibres 1 and 2 may be interchanged with respect to the collection and delivery means without affecting the present invention. In addition, the diameters of the optical fibres used for delivery and collection, and the diameters of the side-hole fibres, may be chosen as convenient to seal the side-hole fibres or not as required. Preferably the diameters are similar, or equal, but do not need to be according to the present invention.

It is to be appreciated that the embodiments of the invention described above with reference to the accompanying drawings have been given by way of example only and that modifications may be effected. Thus, for example, the mirrors may be a variety of types of mirror, including metal film, dielectric film, refractive index differences, or gratings within the fibre.

I claim:

1. An optical fibre pressure sensor in which at least two lengths of side-hole fibre are joined together at adjacent ends of the lengths of side-hole fibre, in which at a joint the two lengths of side-hole fibre are rotated relative to one another around a common axis, in which at least one length of side-hole fibre has its side-hole sealed, and in which at least one length of side-hole fibre has its side-hole exposed to a pressure which is the same as a pressure which is external to that length of side-hole fibre.

2. An optical fibre pressure sensor according to claim 1 in which light delivery and light collection means are connected to the side-hole fibres.

3. An optical fibre pressure sensor according to claim 2 in which the light delivery and light collection means are connected to the side-hole fibres by means of optical fibres such that the side-holes in one length of the fibre are left open and the side-holes in another length of fibre are sealed at the joint.

4. An optical fibre presure sensor according to claim 2 in which the light delivery and light collection means are connected to the side-hole fibers by fusion splicing.

5. An optical pressure sensor according to claim 1 in which the angle of rotation at the joint between fibre lengths is substantially 90°.

6. An optical fibre pressure sensor according to claim 1 in which the total lengths of fibre which have sealed side-holes and open side-holes are substantially equal.

7. An optical fibre pressure sensor according to claim 1 in which a length of side-hole fibre is connected between two other lengths of side-hole fibres such that the side-holes of the fibre are sealed at the joints, and the side-holes of the other ends remain open to external pressure.

8. An optical fibre pressure sensor according to claim 1 and including an optical fibre which acts both as delivery and collection means.

9. An optical fibre pressure sensor according to claim 1 and including an optical fibre polarizer, thereby to form a polarimetric interferometer.

10. An optical fibre pressure sensor according to claim 1 and including a partially reflective mirror from which a portion of light is reflected back through the side-hole fibres to delivery means, and from which another portion of light is transmitted to collection means.

11. An optical fibre pressure sensor according to claim 1 and including a Fabry-Perot polarimetric interferometer in which the ends of the side-hole fibres include partially reflective mirrors inserted into an optical waveguide.

12. An optical fibre pressure sensor according to claim 1 and including a Fabry-Perot polarimetric interferometer in which an optical fibre acts both as light delivery and collection means, light being partially reflected from a first mirror and from a second mirror which is at the end of the side-hole fibre.

* * * * *